United States Patent [19]

Dewhurst

[11] Patent Number: 5,211,749
[45] Date of Patent: May 18, 1993

[54] INTERNAL MOLD RELEASE AGENT FOR USE IN REACTION INJECTION MOLDING

[75] Inventor: John E. Dewhurst, Macungie, Pa.

[73] Assignee: Miles Inc., Pittsburgh, Pa.

[21] Appl. No.: 810,629

[22] Filed: Dec. 19, 1991

Related U.S. Application Data

[60] Division of Ser. No. 546,153, Jun. 28, 1990, Pat. No. 5,076,989, which is a continuation-in-part of Ser. No. 376,336, Jul. 6, 1989, abandoned, which is a division of Ser. No. 243,522, Sep. 12, 1988, abandoned.

[51] Int. Cl.$^5$ .................... B29C 33/56; B29C 33/60; B29C 33/38
[52] U.S. Cl. .................. 106/38.24; 106/38.22; 106/38.7
[58] Field of Search ............ 106/38.22, 38.24

[56] References Cited

U.S. PATENT DOCUMENTS

| | | | |
|---|---|---|---|
| 4,218,543 | 8/1980 | Weber et al. | 521/51 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |

FOREIGN PATENT DOCUMENTS 2101140  1/1983  United Kingdom .

Primary Examiner—Mark L. Bell
Assistant Examiner—Margaret Einsmann
Attorney, Agent, or Firm—Joseph C. Gil; N. Denise Brown

[57] ABSTRACT

The present invention is directed to a mold release, a composition containing the mold release, and a process of using the mold release. The mold release comprises an internal mold release composition comprising
(a) a zinc carboxylate containing from 8 to 24 carbon atoms per carboxylate group, and
(b) a compatibilizer comprising an amidine group-containing compound of the formula

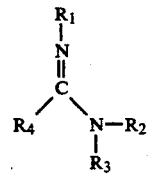

wherein $R_1$, $R_2$ and $R_3$ are straight or branched, saturated or unsaturated hydrocarbon chains having up to 30 carbon atoms which may be substituted by ether groups, ester groups, amide groups or amidine groups and may also be terminated by isocyanate-reactive groups such as hydroxyl or amino groups, $R_4$ corresponds to the definition of $R_1$, $R_2$ and $R_3$, but may additionally represent an aromatic substituent having 6 to 15 carbon atoms or may represent the group $-NR_2R_3$, with the proviso that when $R_4$ represents the group $-NR_2R_3$, $R_1$ can be hydrogen, and wherein $R_1$, $R_2$, $R_3$ and $R_4$ may, with one or both of the amidine nitrogens, form a heterocyclic ring, in an amount sufficient to solubilize the zinc carboxylate.

4 Claims, No Drawings

INTERNAL MOLD RELEASE AGENT FOR USE IN REACTION INJECTION MOLDING

CROSS REFERENCE TO RELATED APPLICATION

This application is a division of application Ser. No. 07/546,153 filed Jun. 28, 1990 now U.S. Pat. No. 5,076,989 which is a continuation-in-part of application Ser. No. 07/376,336, filed Jul. 6, 1989 now abandoned, which is a divisional of application Ser. No. 07/243,522, filed Sep. 12, 1988 (now abandoned).

BACKGROUND OF THE INVENTION

Reaction injection molding (RIM) has become an important process for the production of external automotive body parts and other types of molded products. The RIM process involves the intimate mixing of a polyisocyanate component and an isocyanate-reactive component followed by the injection of this mixture into a mold for subsequent rapid curing. The polyisocyanate component is typically based on a liquid polyisocyanate. The isocyanate-reactive component contains a high molecular weight isocyanate-reactive component, typically a polyol and/or an amine polyether, and usually contains a chain extender containing amino and/or hydroxyl groups. U.S. Pat. No. 4,218,543 describes a RIM process currently being commercially used on a large scale.

While products produced by the RIM process have excellent physical properties, the use of the RIM process was previously limited by the necessity of using sprayed external mold release agents (e.g., waxes, soaps, and the like). These agents had to be sprayed onto the mold surface before each shot or every several shots. Recently, internal mold release agents have become available which obviate the need for external release agents. Specifically, internal mold release agents containing zinc carboxylates where the carboxylate group contains from 8 to 24 carbon atoms has met with widespread commerical use. Release agents of this type are described in U.S. Pat. Nos. 4,519,965, 4,581,386 and 4,585,803; and British Patent 2,101,140. In using such zinc carboxylates it is necessary to mix the carboxylate with a compatibilizer which will solubilize the zinc carboxylate so that when the resultant mixture is mixed with the isocyanate reactive components, the zinc carboxylate will possess improved resistance to precipitation. British Patent 2,101,140 describes the mixture of a zinc stearate and an epoxidized vegetable oil (such as epoxidized soybean oil).

U.S. Pat. Nos. 4,519,965 and 4,581,386 describe the use of compatibilizer selected from the group consisting of nitrogen-containing, isocyanate-reactive acylic compounds and nitrogen-containing, isocyanate-reactive polymers. Preferred compatibilizers include polyether polyamines and amine- or hydroxy-terminated, amine-initiated polyethers. U.S. Pat. No. 4,585,803 describes the use of compatibilizers which are tertiary amine compounds which contain at least one tertiary nitrogen. The tertiary amine compounds described advantageously contain one or more hydroxy groups. Although the combination of the zinc carboxylates and the compatibilizer noted have met with substantial commercial success, the search continues for other satisfactory compatibilizers.

DESCRIPTION OF THE INVENTION

The present invention is directed to a novel internal mold release agent for use in a RIM process, to an isocyanate-reactive component containing the mold release agent, and to the use of the mold release agent in a RIM process.

The internal mold release agent of the present invention comprises:
 (a) a zinc carboxylate containing from 8 to 24 carbon atoms per carboxylate group, and
 (b) a compatibilizer comprising an amidine group-containing compound of the formula

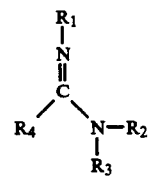

wherein $R_1$, $R_2$ and $R_3$ are straight or branched, saturated or unsaturated hydrocarbon chains having up to 30 carbon atoms which may be substituted by ether groups, ester groups, amide groups or amidine groups and may also be terminated by isocyanate-reactive groups such as hydroxyl or amino groups, $R_4$ corresponds to the definition of $R_1$, $R_2$ and $R_3$, but may additionally represent an aromatic substituent having 6 to 15 carbon atoms or may represent the group $-NR_2R_3$, with the proviso that when $R_4$ represents the group $-NR_2R_3$, $R_1$ can be hydrogen, and wherein $R_1$, $R_2$, $R_3$ and $R_4$ may, with one or both of the amidine nitrogens, form a heterocyclic ring, in an amount sufficient to solubilize the zinc carboxylate.

Suitable zinc carboxylates which may be used in the internal release agent mixture of the present invention are based on $C_8$-$C_{24}$, branched or straight chain fatty acids which may be saturated or unsaturated. The carboxylates also include the commercial preparations of a specific carboxylate which also contains impurities or by-products of other fatty acid derivatives. For example, commercial "stearates" may also contain significant quantities of palmitates, myristates, and the like and commercial "tall oil" derivatives normally contain mixtures of stearates, palmitates, oleates, etc. Examples of specific zinc carboxylates include zinc stearate, zinc oleate, zinc octoate, zinc laurate, zinc ricinoleate and the like.

The preferred zinc carboxylates are those which remain soluble in combination with the compatibilizer when in admixture with the high molecular weight isocyanate-reactive component and the chain extender. The most preferred zinc carboxylate is zinc stearate, especially those having a high purity such as Zinc Stearate Polymer Grade Type N from Witco, Zinc Stearate RSN 131 HS and IPS from Mallinckrodt and Zinc Stearate Heat Stable Polymer Grade from Nuodex. The zinc carboxylates are used in amounts of about 0.5 to 10%, preferably about 1 to 6% and most preferably about 1 to 4% by weight, based on the weight of the isocyanate-reactive components.

Suitable compatibilizers are those of the type noted which assist in compatibilizing or solubilizing the zinc carboxylates without substantially affecting the processing characteristics of the RIM reaction mixture or the physical properties or paintability of the resultant molded articles. More particularly, the compatibilizers of the present invention comprise an amidine group containing compound of the formula

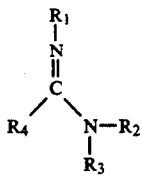 (I)

wherein $R_1$, $R_2$ and $R_3$ are straight or branched, saturated or unsaturated hydrocarbon chains having up to 30, preferably up to 22 carbon atoms which may optionally be substituted by ether groups, ester groups, amide groups or amidine groups and may also optionally be terminated by isocyanate-reactive groups such as hydroxyl or amino groups. $R_4$ corresponds to the definition of $R_1$, $R_2$ and $R_3$, but may additionally represent an aromatic substituent having 6 to 15 carbon atoms or may represent the group $-NR_2R_3$, with the proviso that when $R_4$ represents the group $-NR_2R_3$, $R_1$ can be hydrogen, and wherein $R_1$, $R_2$, $R_3$ and $R_4$ may, with one or both of the amidine nitrogens, form a heterocyclic ring.

Examples of suitable amidine group-containing compounds include diazabicycloundecene, the tetraalkyl guanidines such as tetramethyl guanidine, cyclic amidines of the above formula wherein $R_1$ and $R_2$ form a heterocyclic ring such as compounds corresponding to the formula

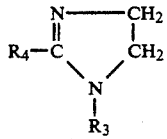 (I)

wherein $R_4$ contains a saturated or unsaturated fatty group having 8 to 30, preferably 8 to 22 carbon atoms such as 1-heptadec-8-7-enyl and preferably 1-heptadecyl and $R_3$ is as defined above. Commercial examples of amidine group containing compounds corresponding to formula I are Monazoline O available from Mona Industries, wherein $R_4$ is 1-heptadec-8-7-enyl and $R_3$ is hydroxy ethyl; Monazoline S available from Mona Industries, wherein $R_4$ is 1-heptadecyl and $R_3$ is hydroxy ethyl; Varisoft 475 available from Sherex Chemical, wherein $R_4$ is a mixture of saturated and unsaturated hydrocarbons and $R_3$ corresponds to the formula

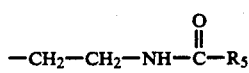

wherein $R_5$ corresponds to $R_4$; Monazoline B-219 available from Mona Industries, wherein $R_4$ is 1-heptadecyl and $R_3$ corresponds to the formula

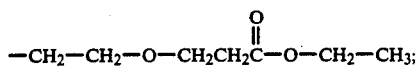

Monazoline CY, available from Mona Industries, wherein $R_3$ is hydroxyethyl, and $R_4$ is derived from caprylic acid; Monazoline T, available from Mona Industries wherein $R_3$ is hydroxyethyl and $R_4$ is derived from tall oil; and Varisoft 3690 imidazoline available from Sherex which is a compound of formula (II), wherein $R_3$ is oleylamidoethyl and $R_4$ is oleyl. Also useful are such materials as Polycat DBU, and Polycat DBN, both available from Air Products (diazobicycloundecene and diazobicyclononane, respectively).

The mold release compositions of the present invention are suitable for use with either flexible or rigid, optionally cellular, polyurethane or polyurea elastomers. The molded articles may possess various combinations of these properties such as rigid, non-cellular elastomers or flexible, cellular products for use, e.g., as shoe soles. "Polyurethanes" as defined throughout this application are polyaddition products wherein urethane groups and optionally urea groups are formed during the RIM process according to the invention. "Polyureas" are defined as polyaddition products wherein only urea groups are formed during the RIM process according to the invention.

The present invention is also directed to an isocyanate-reactive mixture comprising
(i) a high molecular weight polymer having at least two isocyanate-reactive groups and having a molecular weight of from 400 to about 10,000,
(ii) from about 5 to 50% by weight, based on the weight of component (i) of a chain-extender having at least two isocyanate-reactive groups and
(iii) an internal mold release agent mixture comprising:
  (a) from about 0.05 to about 10% by weight, based on the weight of components (i) and (ii) of a zinc carboxylate containing from 8 to 24 carbon atoms per carboxylate groups, and
  (b) compatibilizer comprising an amidine group-containing compound of the formula

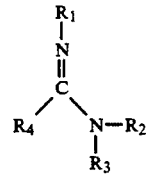

wherein $R_1$, $R_2$ and $R_3$ are straight or branched, saturated or unsaturated hydrocarbon chains having up to 30 carbon atoms which may be substituted by ether groups, ester groups, amide groups or amidine groups and may also be terminated by isocyanate-reactive groups such as hydroxyl or amino groups, $R_4$ corresponds to the definition of $R_1$, $R_2$ and $R_3$, but may additionally represent an aromatic substituent having 6 to 15 carbon atoms or may represent the group $-NR_2R_3$, with the proviso that when $R_4$ represents the group $-NR_2R_3$, $R_1$ can be hydrogen, and wherein $R_1$, $R_2$, $R_3$ and $R_4$ may, with one or both of the amidine nitrogens, form a heterocyclic ring, in an amount sufficient to solubilize the zinc carboxylate so that when component (iii) is in admixture with components (i) and (ii), the zinc carboxylate possesses improved resistance to precipitation. Finally the present invention is directed to a process for the production of optionally cellular parts by reacting a reaction mixture comprising the isocyanate-reactive component which contains the internal mold release with a polyisocyanate, said reaction mixtures being processed by the RIM process at an isocyanate index of from 70 to 130.

Suitable polyisocyanates for use in the present invention are aliphatic, cycloaliphatic, araliphatic, aromatic and heterocyclic polyisocyanates which are known and described for example by W. Siefken in Justus Liebigs Annalen der Chemie, 562, pages 75-136. Specific examples include ethylene diisocyanate, 1,4-tetramethylene diisocyanate, 1,6-hexamethylene diisocynate, 1,12-dodecane diisocyanate, cyclobutane- 1,3-diisocyanate, cyclohexane-1,3- and -1,4-diisocyanate and mixtures thereof, 1-isocyanato-3,3,5-trimethyl-5-isocyanatomethyl-cyclohexane (isophrone diisocyanate or IPDI), 2,4- and 2,6-hexahydrotoluylene diisocyanate and mixtures thereof, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-toluylene diisocyanate and mixtures thereof, diphenyl methane 2,4'- and/or 4,4'-diisocyanate, naphthylene 1,5-diisocyanate, triphenyl methane-4,4',4''-triisocyanate and polyphenyl polymethylene polyisocyanates of the type obtained by condensing aniline with formaldehyde, followed by condensation.

It is preferred to use the readily available polyisocyanates such as 2,4- and 2,6-toluene diisocyanate and mixtures of these isomers, polyphenyl polymethylene polyisocyanates of the type obtained by condensing aniline with formaldehyde, followed by phosgenation, and polyisocyanates containing carbodiimide groups, urethane groups, allophanate groups, isocyanurate groups, urea groups or biuret groups. Particularly preferred are the liquid derivatives of 4,4'-diphenyl methane diisocyanate (MDI) which may be liquefied inter alia by introducing carbodiimide groups, blending with 2,4'-diphenyl methane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Other suitable reactants for preparing the products of the present invention include compounds containing at least two isocyanate-reactive groups. These compounds may be divided into two groups, high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of BF$_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g. reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

Suitable aminopolyethers which may be used in accordance with the present invention as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (BE-PS 634,741). U.S. Pat. No. 3,654,370 describes the production of polyoxyalkylene polyamines by reaction of the corresponding polyol with ammonia and hydrogen in the presence of a nickel, copper, chromium catalyst. DE-PS 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728, 3,236,895 and FR-PS 1,551,605. The production of polyethers containing terminal secondary amino groups is described, for example, in FR-PS 1,466,708.

Polyhydroxypolyethers of relatively high molecular weight may be converted into the corresponding anthranilic acid esters by reaction with isatoic acid anhydride, as described, for example, in DE-OS Nos. 2,019,432 and 2,619,840 and in U.S. Pat. Nos. 3,808,250, 3,975,428 and 4,016,143. Polyethers containing terminal aromatic amino groups are formed in this way.

According to DE-OS 2,546,536 and U.S. Pat. No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with DE-OS 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with up to about 95% by weight, preferably up to about 50% by weight, more preferably about 8 to 30% by weight and most preferably about 12 to 26% by weight, based on the total quantity of the high molecular weight compounds, of the low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1 methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino diphenylmethane, 1,2- and 1,4-phenylene diamine, naphthalene-1,5-diamine and triphenylmethane-4, 4',4"-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the high molecular weight component.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, chain extender, the internal mold release agent mixture and any other additive which is to be included.

The invention is further illustrated but is not intended to be limited by the following examples in which all parts and percentages are by weight unless otherwise specified.

EXAMPLES

EXAMPLE 1

The amidine used was Monazoline CY, available from Mona Industries, and having the structure:

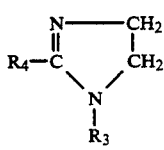

where $R_3$ is hydroxyethyl and $R_4$ is derived from caprylic acid. In each case, 2 parts of the zinc carboxylic were dissolved in 4 parts of the amidine. In each instance, the mixtures were heated at a rate of 1° C. per minute until dissolution began. The mixtures were then held at that temperature until dissolution was complete. Zinc oleate and zinc stearate yielded clear liquids, while zinc laurate yielded a cloudy liquid.

EXAMPLE 2

2 parts each of zinc oleate, zinc laurate and zinc stearate were dissolved in 4 parts of Polycat DBU using the identical technique of Example 1. Clear liquids were obtained in the case of zinc oleate and zinc stearate, while a cloudy liquid was obtained in the case of zinc laurate. Polycat DBU is available from Air Products, and has the structure:

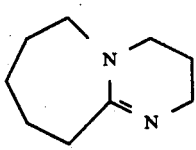

EXAMPLE 3

2 parts of zinc oleate, zinc laurate and zinc stearate ere dissolved in 4 parts of Polycat DBN using the exact technique of Example 1. A clear liquid was obtained in the case of zinc oleate, a cloudy liquid was obtained in the case of zinc stearate and the components separated in the case of zinc laurate. Polycat DBN is available from Air Products, and has the following structure:

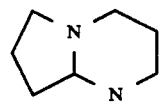

EXAMPLE 4

2 parts each of zinc oleate, zinc laurate and zinc stearate were dissolved in 4 parts of Sherex's Varisoft 3690 imidazoline using the exact technique of Example 1. In the case of zinc oleate, a clear liquid resulted, while in the case of zinc laurate and zinc stearate, a solid resulted. Varisoft 3690 imidazoline is of the structure:

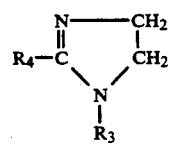

where $R_3$ is oleylamido ethyl, and $R_4$ is oleyl.

EXAMPLE 5

2 parts each of zinc oleate, zinc laurate and zinc stearate were dissolved in 4 parts of Monazoline O from Mona Industries using the exact technique of Example 1. In the case of zinc oleate, a clear liquid resulted. In the case of zinc laurate, a cloudy viscous liquid resulted, while in the case of zinc stearate, a solid resulted. Monazoline O is of the structure:

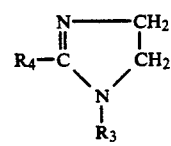

where $R_3$ is hydroxy ethyl and $R_4$ is 1-heptodecyl.

EXAMPLE 6

2 parts each of zinc oleate, zinc laurate and zinc stearate were dissolved in 4 parts of tetramethyl guanidine using the exact technique of Example 1. Clear liquids resulted in the cases of zinc oleate and zinc stearate, while a separated liquid resulted with zinc laurate.

EXAMPLE 7

2 parts each of zinc oleate, zinc laurate and zinc stearate were dissolved in 4 parts of Monazoline T using the exact technique of Example 1. There was slight separation of components in the case of zinc oleate. A cloudy liquid resulted in the case of zinc laurate, a solid resulted in the case of zinc stearate.

RIM EXAMPLES 8-14

Zinc laurate solubilized by Monazoline O was tested in several RIM systems. In the RIM examples, the following materials were used:

a) POLYOL: An ethylene oxide-tipped, glycerine-initiated, propylene oxide/ethylene oxide polyether (weight ratio of propylene oxide to ethylene oxide of about 7:1) having an OH number of about 28.

b) DETDA: An 80/20 mixture of 1-methyl-3,5-diethyl-2,4- and -2,6-diamino benzene.

c) SOLUBILIZER A: An ethylene diamine/propylene oxide adduct having an OH number of about 630.

d) SOLUBILIZER B: An amine terminated polyether having a molecular weight of about 400, containing three primary amino groups, and available from Texaco as Jeffamine T-403.

e) DBTDL: Dibutyltin dilaurate.

f) TEDA: Triethylenediamine g) ISO: A tripropylene glycol/4,4'-methylene bis(phenylisocyanate) adduct having an NCO content of about 23%.

See Table I. Examples 8 and 9 were comparative examples, while Examples 10 through 14, which use Monazoline O, fall under the present invention. These system show much higher elongation, notched Izod impact and tear strength. In addition, tin and amine catalysts were not needed for good green strength (System F). All systems showed good release and green strength.

RIM plaques were prepared using an LK-06 laboratory RIM machine. A rectangular mold, 300 mm×200 mm×8 mm, was used to mold the samples under the following conditions:

| Component A Temperature | 32° C. |
| Component B Temperature | 40° C. |
| Isocyanate Index | 110 |
| A/B Weight Ratio | (125–140)/100 |
| Mold Temperature | 60° C. |
| Impingement Pressure | 2646 PSI |
| External Mold Release | CHEM-TREND MR-515 |
| Demolding Time | 2 minutes |
| Postcure Conditions | 120° C. for 1 hour |

The external release agent was only applied to the mold prior to the production of the first sample. The samples were tested for density (ASTM D-792), flex modulus (ASTM D-790), elongation (ASTM D-638), heat sag (ASTM D-3769), tear strength-die "C" (ASTM D-624) and notched Izod (ASTM D-256).

The results and formulations (in parts by weight) were as set forth in Table I.

TABLE I

| | 8 | 9 | 10 | 11 | 12 | 13 | 14 |
|---|---|---|---|---|---|---|---|
| B-Side | | | | | | | |
| Polyol | 74.8 | 74.8 | 73.8 | 74.8 | 79.8 | 79.9 | 76 |
| DETDA | 20 | 20 | 20 | 20 | 20 | 20 | 20 |
| Solubilizer A | 3 | — | — | — | — | — | — |
| Solubilizer B | — | 3 | — | — | — | — | — |
| Monazoline O | — | — | 4 | 3 | 2 | 2 | 2 |
| Zinc Laurate | 2 | 2 | 2 | 2 | 2 | 2 | 2 |
| DBTDL | .1 | .1 | .1 | .1 | .1 | .1 | — |
| TEDA | .1 | .1 | .1 | .1 | .1 | — | — |
| A-Side | | | | | | | |
| ISO | 57.6 | 59.0 | 53.1 | 52.7 | 52.2 | 52.2 | 52.2 |
| Density, pcc | 65.8 | 69.7 | 69.8 | 65.9 | 69.2 | 69.7 | 69.1 |
| Flex Mod, psi | 63700 | 62900 | 64100 | 61800 | 59100 | 61700 | 59400 |
| Elongation, % | 115 | 167 | 197 | 227 | 220 | 208 | 198 |
| Izod, ft-lb/in | 6.05 | 8.62 | 12.0 | 12.2 | 11.4 | 11.0 | 11.1 |
| Tear Strength, lbs/in | 574 | 599 | 671 | 620 | 643 | 644 | 608 |
| Heat Sag | | | | | | | |
| (6″, 290° F.), mm | 14.7 | 10.7 | 31.0 | 27.0 | 22.8 | 27.3 | 19.5 |
| (4″, 329° F.), mm | 20.8 | 26.0 | 49.5 | 42.5 | 38.8 | 37.8 | 35.5 |

Although the invention has been described in detail for purpose of illustration, it is to be understood that such detail is solely for that purpose and that variations can be made therein by those skilled in the art without departing from the spirit and scope of the invention except as it may be limited by the claims.

What is claimed is:

1. An internal mold release composition comprising
(a) a zinc carboxylate containing from 8 to 24 carbon atoms per carboxylate group, and
(b) a compatibilizer comprising an amidine group-containing compound of the formula (1)

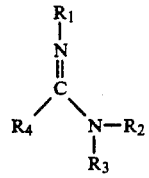

wherein $R_1$, $R_2$, $R_3$, and $R_4$ are straight or branched, saturated or unsaturated hydrocarbon chains, in an amount sufficient to solubilize the zinc carboxylate.

2. A composition according to claim 1 wherein component (b) has $R_1$, $R_2$, $R_3$, and $R_4$ such that, with one or both of the amidine nitrogens, a heterocyclic ring is formed.

3. A composition according to claim 1 wherein component (b) has a molecular weight not exceeding 1500.

4. A composition according to claim 1 wherein component (a) is zinc stearate.

* * * * *